United States Patent Office 3,594,375
Patented July 20, 1971

3,594,375
TRIAZINE COMPOUNDS
Max Schellenbaum, Muttenz, and Max Duennenberger, Frenkendorf, Switzerland, assignors to Ciba Limited, Basel, Switzerland
No Drawing. Filed Nov. 26, 1968, Ser. No. 779,254
Claims priority, application Switzerland, Dec. 14, 1967, 17,546/67
Int. Cl. C07d 55/20
U.S. Cl. 260—249.9                          4 Claims

ABSTRACT OF THE DISCLOSURE

The present invention is concerned with new arylguanamines wherein one carbon atom of the triazine ring is linked directly to a benzene ring, the second carbon atom is linked by an —NH— group to a benzene ring and the third carbon atom is linked to an —HN— alkylene group, the latter being bound to the nitrogen atoms of a tertiary amino group. The new arylguanamines are useful for controlling harmful microorganisms.

---

The present invention provides arylguanamines of the formula (1)

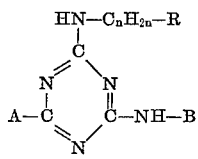

in which A and B each represents a benzene residue, R a dialkylamino group whose alkyl residues contain 1–6 carbon atoms each, a di-(hydroxyalkyl)-amino group whose hydroxyalkyl residues contain 2–4 carbon atoms each, or a saturated heterocyclic monocyclic residue which is linked with the group $C_nH_{2n}$— through a nitrogen atom bound exclusively to carbon and contains as further cyclic members 4 or 5 carbon atoms and as many oxygen or further nitrogen atoms as are needed to make the number of cyclic members 5 or 6, and $n$ is 2 or a greater digit. The invention further provides the salts of these arylguanamines, including the quaternary ammonium salts.

Specially valuable are arylguanamines of the formula (2)

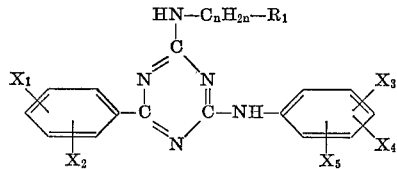

in which $X_1$ and $X_2$ each represents a hydrogen or halogen atom or an alkyl group with 1–4 carbon atoms, $X_3$ and $X_4$ each represents a hydrogen or halogen atom or a trifluoromethyl group, $X_5$ represents a hydrogen or halogen atom, $n$ is 2 or a greater digit, and $R_1$ is a residue of one of the following formulae:

(3)

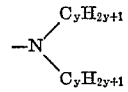

in which $y$ is a digit, at most 6

(4)

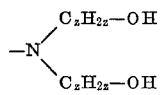

in which $z = 2, 3$ or $4$, (5)

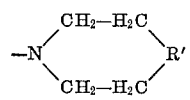

in which R' represents a direct bond, a —CH$_2$— group, an oxygen atom, an —NH— group or an —N-alkyl— group containing 1 or 2 carbon atoms.

Preferred arylguanamines correspond to the formula (6)

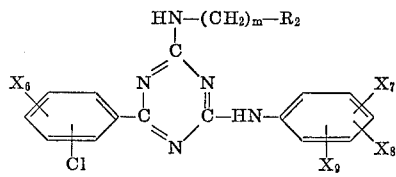

in which $X_6$ and $X_9$ each represents a hydrogen or chlorine atom, $X_7$ and $X_8$ each represents a chlorine atom or a trifluoromethyl group, $R_2$ stands for a 4-morpholyl or dialkylamino group in which the alkyl residues contain 1–4 carbon atoms, and $m=2$ or $3$.

Particularly valuable results have been obtained with the arylguanamines of the formula (7)

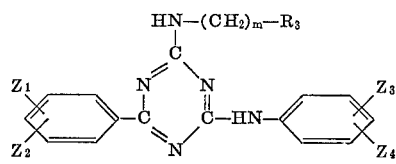

in which $Z_1$ represents a chlorine or bromine atom or a methyl group, $Z_2$ a hydrogen or chlorine atom, $Z_3$ and $Z_4$ each represents a chlorine or bromine atom or a trifluoromethyl group, $R_3$ stands for a dimethylamino or diethylamino group or a morpholino or piperidino residue linked through the nitrogen atom with the group —(CH$_2$)$_m$—, and $m=2$ or $3$. The substituents $Z_3$ and $Z_4$ may be identical or different.

In general it is advantageous when at least one of the two benzene residues (A or B) contains at least one halogen atom. Such halogen atoms may be, for example chlorine or bromine atoms linked directly with the benzene nuclei or they may be present in trifluoromethyl groups.

The arylguanamines of the Formulae 1, 2, 6 and 7 are accessible by known methods, for example by reacting a compound of the formula (8)

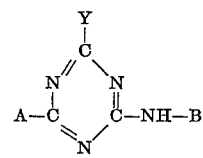

at an elevated temperature with a compound of the formula (9)      $H_2N—C_nH_{2n}—R$ in which A, B, R and $n$ have the above meanings and Y represents a halogen atom.

According to a preferred process a compound of the formula (10)

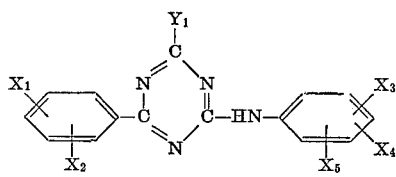

is reacted at an elevated temperature with an amine of the formula

(11)      $H_2N—C_nH_{2n}—R_1$ in which $X_{1-5}$, $R_1$ and $n$ have the above meanings and $Y_1$ represents a chlorine or bromine atom.

Particularly useful arylguanamines are obtained by reacting a compound of the formula

(12)
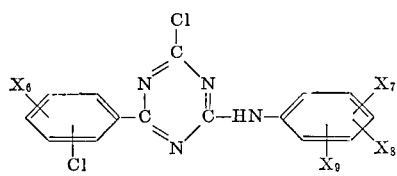

with an amine of the formula

(13) $\qquad H_2N—(CH_2)_m—R_2$

in which $X_{6-9}$, $R_2$ and $m$ have the above meanings.

The arylguanamines of the Formula 1 may be prepared with the use of the following amines of the Formula 9, 11 or 13:

1-amino-2-dimethylaminoethane,
1-amino-3-dimethylaminopropane,
1-amino-1-methyl-2-dimethylaminoethane,
1-amino-2-methyl-2-dimethylaminoethane,
1-amino-2-diethylaminoethane,
1-amino-3-diethylaminopropane,
1-amino-1-methyl-4-diethylaminobutane,
1-amino-2-diisopropylaminoethane,
1-amino-3-di-n-butylaminopropane,
1-amino-3-di-(β-hydroxyethyl)-aminopropane,
N-(2-aminoethyl)-morpholine,
N-(3-aminopropyl)-morpholine,
N-(3-aminopropyl)-piperidine,
N-(2-aminoethyl)-piperazine,
N-(3-aminopropyl)-N'-methylpiperazine or
N-(2-aminoethyl)-pyrrolidine.

The compounds of the Formulae 8, 10 and 12 used as starting material are accessible in the known manner by reacting, for example, a 2-aryl-4,6-dihalogeno-1,3,5-triazine with an aromatic amine, for example:

1-amino-2- or -4-chlorobenzene,
1-amino-2,4- or -3,4-dichlorobenzene,
1-amino-2,4,5-trichlorobenzene, the corresponding mono-, di- and tribromo compounds, 1-amino-2- or -4-iodobenzene,
1-amino-2-, -3- or -4-fluorobenzene,
1-amino-3-trifluoromethylbenzene,
1-amino-3,5-bistrifluoromethylbenzene,
1-amino-3-trifluoromethyl-4-chlorobenzene and the like.

The compounds of the Formula 1 are advantageously manufactured in an inert solvent, for example in acetone, chloroform or chlorobenzene or especially in dioxan. The elevated reaction temperature is preferably from 40 to 150° C., especially from 50 to 70° C.

It is furthermore of advantage to carry out the reaction of the compounds of the Formulae 8 and 9 in the presence of an acid acceptor, for example an alkali metal hydroxide such as sodium or potassium hydroxide, an alkaline earth metal hydroxide such as calcium hydroxide, an alkali metal carbonate such as sodium carbonate or of an alkali metal bicarbonate such as sodium bicarbonate. It is especially advantageous to use an excess of the nitrogen base of the Formula 9. In other words—instead of reacting the reactants at approximately equimolecular proportions they are used at a molecular ratio of the compound of the Formula 8 to the compound of the Formula 9 of approximately 1:2.

The basic arylguanamines accessible as described above can be converted in known manner into salts, for example with the aid of acids such as hydrochloric, formic, acetic or salicylic acid or of a quaternating agent such as an alkyliodide, alkylbromide, dimethylsulphate or benzylchloride.

The compounds of the Formula 1 and their salts are especially suitable for controlling harmful microorganisms. They are specially suitable for protecting organic materials from infestation and damage by microorganisms, particularly fungi and bacteria.

A particularly surprising fact emanating in the use of these compounds as active ingredients of preparations for controlling microorganisms is their broad antibacterial activity spectrum which with many compounds includes both Gram-positive and Gram-negative bacteria. Insofar as their application is concerned, the absence of odours and colours in the compounds of this invention is of special value.

Accordingly, the present invention includes also the use of the new compounds in pest control quite generally. The antimicrobial compounds may be used on a very broad basis, especially for protecting organic substrates from infestation by destructive and pathogenic (including phytopathogenic) microorganisms. Thus, the above-mentioned antimicrobial products are also suitable for use as preservatives as well as distinfectants for textile materials and technical products of all kinds, in plant protection, in agriculture, in veterinary medicine and in cosmetics.

Examples of technical products that can be preserved with the aid of the new compounds are: Textile adjuvants and improving agents, glues, binders, paints, dyeing pastes and printing inks and similar preparations based on organic or inorganic dyestuffs and pigments, including those which are admixed with casein or other organic compounds. Wall and ceiling paints, for example those which contain a proteinic paint binder, are likewise protected from infestation by microorganisms on addition of the new compounds. It is also possible to use them in timber protection.

Furthermore, the new compounds may be used for a preserving and disinfecting finish on fibres and textiles; they may be applied to natural and synthetic fibres alike and produce on them a permanent activity against harmful (including pathogenic) microorganisms, for example fungi and bacteria. The compounds may be added before, during or after a treatment of these textiles with other substances, for example dye pastes or printing inks, dressings or the like.

Textile materials thus treated are also protected against the occurrence of perspiration odour caused by microorganisms.

The new compounds may also be used as preservatives in the cellulose and paper industries, inter alia for preventing the known formation of slime in the paper-making machines caused by microorganisms.

Furthermore, when the compounds of this invention are combined with detergent or surface-active substances there are obtained washing and cleaning agents having excellent antibacterial and/or antimycotic properties. The compounds of the general formulae shown above may be incorporated, for example, with soaps or combined with soap-free detergent or surface-active substances, or they may be combined with mixtures of soaps and soap-free detergent substances; in such combinations the antimicrobial activity of the new compounds is fully retained.

Cleaning agents containing compounds of the above-mentioned formulae may also be used in industry and in the home; they may also be used in the food industries, for instance in dairies, breweries or abattoirs, as ingredients of preparations used for cleaning and disinfecting in hospitals and in the physician's surgery.

The activity of the compounds of this invention may also be utilized in preserving and disinfecting dressings on plastics. When a plasticizer is used, it is advantageous to aid the antimicrobial compound in form of a solution or dispersion in the palsticizer to the plastic. It is advantageous to ensure as uniform a distribution as possible in the plastic. The plastics having antimicrobial properties may be used for utilitarian articles of all kinds which are desired to have an activity against pathogens of all kinds, for example bacteria and fungi, for example in doormats, bathroom curtains, seats, treads in swimming baths, wall coverings and the like. By incorporation with wax and polishes there are obtained floor and furniture polishes having disinfecting properties.

The antimicrobial substances may be applied to the textile materials to be protected in a variety of ways, for example by impregnation or spraying with solutions or suspensions containing the above-mentioned compounds as active ingredient. The content of active ingredient may be varied to suit the individual purpose from 1 to 30 g. of active substance per litre of treatment liquor.

In most cases textile materials of a synthetic and also natural origin are sufficiently protected from infestation by fungi and bacteria by a content of 0.1 to 3% of active substance. The said active substances may be used in conjunction with other textile assistants such as dressings, anticrease finishes or the like.

The form of application of the active substances of this invention may be that in which agents for controlling microorganisms are usually formulated; for instance preparations containing the said active substances may also contain further additives such as vehicles, solvents, diluents, dispersants, wetting agents, adhesives and the like, as well as further pesticidal compounds.

Unless otherwise indicated, parts in the following examples are by weight.

EXAMPLE 1

In the course of 30 minutes at 60 to 65° C. a solution of 20.4 parts of 1-amino-3-dimethylaminopropane in 20 parts by volume of dioxane is stirred into 38.6 parts of 2-(4'-chlorophenyl) - 4-(3'',4''-dichloranilino)-6-chloro-1,3,5-triazine in 400 parts by volume of dioxane. The clear reaction solution is poured over 3000 parts of ice water and the precipitated Compound A of the formula (A)

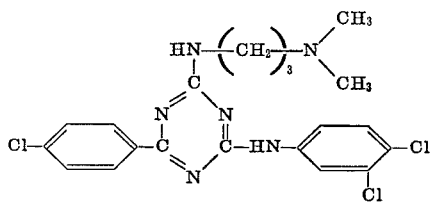

is filtered off, washed with water and dried. The yield is approximately 40 to 43 parts. The product melts at 142–144° C.; after purification by recrystallization from chlorobenzene it melts at 149–150° C.

In the same manner as Compound A, the Compounds B to O of Table I can be prepared; they correspond to the above general Formula I in which the residue A, B and $C_nH_{2n}$—R have the meanings shown in the table.

TABLE I

| Compound | A— | —B | —$C_nH_{2n}$—R | M.P., °C. |
|---|---|---|---|---|
| A | Cl—C₆H₄— | —C₆H₃(Cl)(Cl) (3,4-diCl) | —(CH₂)₃—N(CH₃)₂ | 149–150 |
| B | | | —(CH₂)₃—N(C₂H₅)₂ | 110–111 |
| C | | | —(CH₂)₂—N(C₂H₅)₂ | 103–105 |
| D | | | —(CH₂)₂—N(CH₃)₂ | 141–142 |
| E | | | —(CH₂)₂—N(morpholino) | 147–148 |
| F | | —C₆H₃(CF₃)(CF₃) | —(CH₂)₂—N(C₂H₅)₂ | 84–86 |
| G | | —C₆H₃(Cl)(CF₃) | | 86–88 |
| H | Cl—C₆H₄— | —C₆H₃(Cl)(CF₃) | —(CH₂)₂—N(CH₃)₂ | 149–150 |
| I | Cl—C₆H₃(Cl)— | —C₆H₃(Cl)(Cl) | Same as above | 147–148 |
| J | Cl—C₆H₄— | Same as above | —(CH₂)₂—N(piperidino) | 151–152 |
| K | Same as above | do. | —CH(CH₃)—CH₂—N(CH₃)₂ | 153.5–155 |

TABLE I—Continued

| Compound | A— | —B | —C$_n$H$_{2n}$—R | M.P., °C. |
|---|---|---|---|---|
| L | ......do...... | (3,5-dibromophenyl) —Br with Br | —(CH$_2$)$_3$—N(morpholino) | 120–121.5 |
| M | H$_3$C—C$_6$H$_4$— | (3,4-dichlorophenyl) —Cl with Cl | —(CH$_2$)$_3$—N(CH$_3$)$_2$ | 116.5–118 |
| N | Br—C$_6$H$_4$— | (3-CF$_3$, 4-Cl phenyl) —Cl with CF$_3$ | —(CH$_2$)$_3$—N(morpholino) | 126–128 |
| O | Cl—C$_6$H$_4$— | (2,3,4-trichlorophenyl) Cl, Cl, Cl | —(CH$_2$)$_3$—N(CH$_3$)$_2$ | 153.5–155 |

EXAMPLE 2

A solution of 15 parts of compound A in 300 parts by volume of ethyl acetate is mixed at 20° C. with 6 parts by volume of methyliodide. After a short time the methiodide of the formula (P) 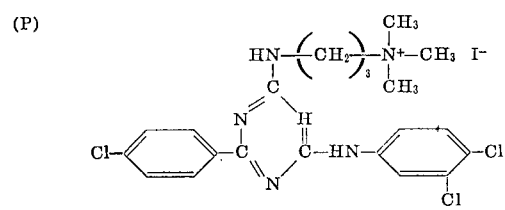

settles out in crystalline form. Yield: 19 parts. Melting point 229–230° C. After recrystallization from alcohol the pure methiodide melts at 232–233° C.

In an identical manner the compounds of the formulae (Q) 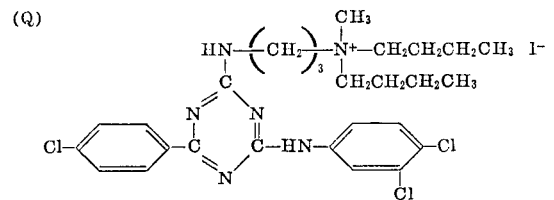

and (R) 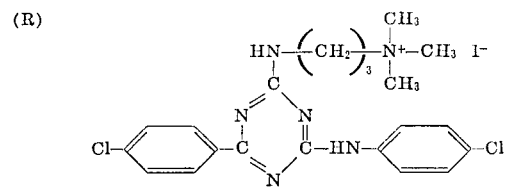

can be prepared. The starting materials accessible from the monochlorotriazine compounds 1-amino-3-di-n-butyl-aminopropane and 1-amino-3-dimethylaminopropane by the method of Example 1 are difficult to purify and are used as oily crude products.

Melting points:
Compound P—115 to 118° C.
Compound Q—216 to 217° C.

EXAMPLE 3

1.0 part of the compound J is dissolved in 25 parts by volume of benzene and precipitated by introduction of hydrogen chloride as the hydrochloride of the formula (S) 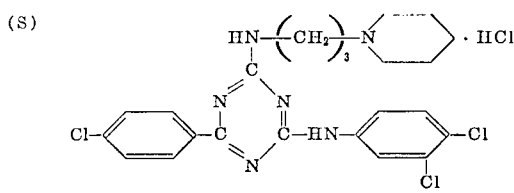

The product is filtered off and purified by recrystallization from alcohol+dioxane. Yield: 0.9 part. Melting point 251° C. with decomposition.

In an identical manner the compound of the formula (T) 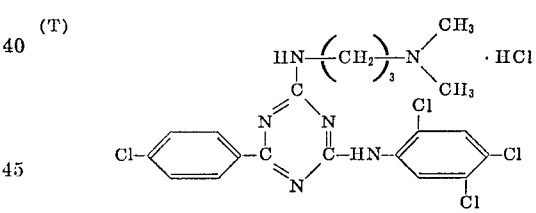

can be manufactured; it melts at 267–269° C.

EXAMPLE 4

Measuring the minimal inhibitory concentration (MIC) against bacteria and fungi in the dilution test The minimal inhibitory concentration (MIC) is determined by a method adapted from standard specifications which affords an approximation to the absolute minimal inhibitory values of an active substance.

A solution of 0.4% and 0.12% each of the active substances in dimethylsulphoxide is prepared. 0.25 ml. of each solution is then added to 9.75 ml. of sterile brain heart infusion broth (bacteria) and beerwort solution (fungi). The two series obtained by continued dilution to one-tenth the preceding concentration are combined and thereby converted into the following continuous dilution series: 100, 30, 10, 3, 1 . . . p.p.m. of active substance.

The solutions are inoculated with the bacteria *Staphylococcus aureus* and *Ascherichia coli*, and with the fungi *Aspergillus niger* and *Rhizopus nigricans* respectively. The bacterial solutions are then incubated for 48 hours at 37° C. (bacteriostatic test) and the fungus solutions for 72 hours at 30° C. (fungistatic test).

After the indicated incubation times the minimal inhibitory values in p.p.m., shown in Table II, are found:

TABLE II

| | Inhibition values in p.p.m. | | | |
|---|---|---|---|---|
| | Bacteriostasis | | Fungistasis | |
| Compound | Staphylococcus aureus | Escherichia coli | Aspergillus niger | Rhizopus nigricans |
| A | 3 | 30 | 30 | 30 |
| B | 3 | 100 | >100 | >100 |
| C | 3 | >100 | 30 | 30 |
| D | 3 | 30 | 30 | 30 |
| E | 3 | | 30 | 30 |
| F | 3 | >100 | 30 | 30 |
| G | 3 | >100 | 30 | 30 |
| H | 1 | >100 | 100 | 30 |
| I | 1 | >100 | 30 | 30 |

EXAMPLE 5

100 gram-samples of cotton creton are impregnated on a padder with a 1% solution each of compound A, C and G in dimethyl formamide at 20° C. and then expressed to a weight increase of 100%.

The dried fabrics contain 1% of active substance, referred to their own original weights.

To test the effect against bacteria round blanks of 10 mm. diameter of the impregnated fabrics, one half without watering and the other half after having been watered for 24 hours at 29° C., are placed on brain heart infusion agar plates previously inoculated with *Staphylococcus aureus*. The plates are then incubated for 24 hours at 37° C.

To test the effect against fungi round blanks of 25 mm. diameter are placed on beerwort agar plates, then inoculated with *Aspergillus niger*, and the plates are incubated for 72 hours at 30° C.

The evaluation extends, on one hand, to the inhibitory zone (IZ in mm.) around the blanks and, on the other hand, to the microscopically discernible growth (G in percent) underneath and/or on the fabric.

TABLE III

| | | Unwatered | | Watered | |
|---|---|---|---|---|---|
| Compound | Organism tested | IZ, mm. | G percent | IZ, mm. | G percent |
| A | Staphylococcus aureus | 2 | 0 | 1 | 0 |
| A | Aspergillus niger | 14 | 0 | 0 | 0 |
| C | Staphylococcus aureus | 1 | 0 | 1 | 0 |
| C | Aspergillus niger | 0 | 0 | 0 | 0 |
| G | Staphylococcus aureus | 1 | 0 | 1 | 0 |
| G | Aspergillus niger | 0 | 0 | 0 | 0 |

EXAMPLE 6

Measuring the minimal inhibitory concentration (MIC) against bacteria and fungi in the gradient plate test Suitable formulations of the compounds of the Formula 1 [for example as solutions in dimethylsulphoxide] of specific concentrations are mixed with warm brain heart infusion agar (bacteria) and, respectively, Mycophil agar (fungi). The liquid mixtures are poured over a solidified, wedge-shaped basic agar layer and likewise allowed to solidify.

By means of a Pasteur pipette the test organisms are applied in lines at right angles to the gradient. After incubation for 24 hours at 37° C. (bacteria) and, respectively, 72 hours at 30° C. (fungi) the length of the germs grown on the inoculation line is measured and expressed in p.p.m. of active substance.

TABLE IV

| | Minimal inhibitory concentration in p.p.m. | | | |
|---|---|---|---|---|
| Compound | Streptococcus mitis | Candida albicans | Trichophyton interdigitale | Trichophyton mentagrophyte |
| A | 1 | 10 | 1 | 1.5 |
| B | 0.45 | 2 | 1.5 | 1.5 |
| C | 1 | 15 | 1 | 2 |
| D | 1 | 10 | 1 | 1.5 |
| E | 1 | 10 | 1.5 | 25 |
| F | 1 | | 0.3 | 10 |
| G | 1 | 10 | 1.5 | 2 |
| H | 1 | 4 | 2 | 1.5 |
| J | | | 30 | 2 |
| P | 1.5 | | 3 | 3 |

We claim:
1. A triazine compound having the formula

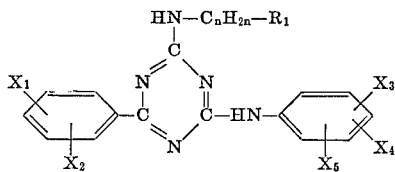

or acid or quaternary ammonium salts thereof in which $X_1$ and $X_2$ each represent a member selected from the group consisting of a hydrogen atom, a halogen atom and an alkyl radical of 1 to 4 carbon atoms, $X_3$ and $X_4$ each represents a member selected from the group consisting of a hydrogen atom, a halogen atom and a trifluoromethyl group, $X_5$ represents a member selected from the group consisting of a hydrogen atom and a halogen atom, $R_1$ represents a member selected from the group consisting of a radical of the formula

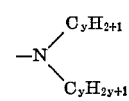

wherein $y$ is a whole member of at the most 6, a radical of the formula

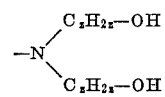

wherein $z$ is a whole member from 2 to 4, and a radical of the formula

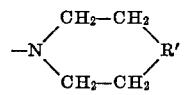

wherein R′ is a direct bond, a —CH$_2$— group, an oxygen atom, an —NH— group or an —N-alkyl group with at most 2 carbon atoms, and $n$ represents 2 or 3.

2. A triazine compound according to claim 1 of the formula

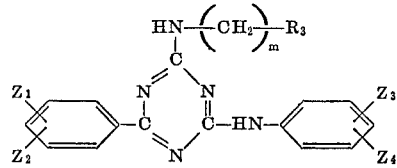

wherein $Z_1$ represents a member selected from the group consisting of a chlorine atom, a bromine atom and a methyl group, $Z_2$ represents a member selected from the group consisting of a hydrogen atom and a chlorine atom, $Z_3$ and $Z_4$ each represents a member selected from the group consisting of a chlorine atom, a bromine atom and a trifluoromethyl group, $R_3$ represents a member selected from the group consisting of a dimethylamino radical, a diethylamino radical, a morpholino radical bound to —$(CH_2)_m$— by its nitrogen atom and a piperidino radical bound to —$(CH_2)_m$— by its nitrogen atom, and $m$ represents a whole member from 2 to 3.

3. An arylguanamine according to claim 1 which corresponds to the formula

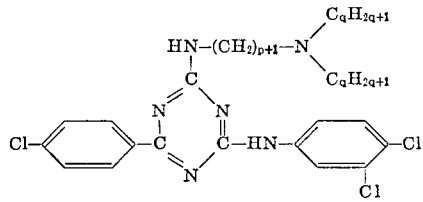

wherein $p$ and $q$ each represents a whole member of at most 2.

4. An arylguanamine according to claim 1 which corresponds to the formula

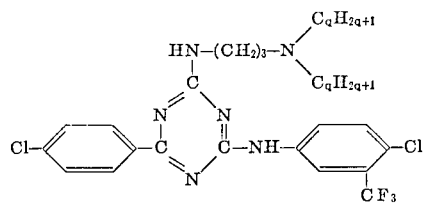

wherein $q$ represents a whole member of at the most 2.

References Cited

UNITED STATES PATENTS

| | | | |
|---|---|---|---|
| 2,980,676 | 4/1961 | Zuppinger et al. | 260—249.9X |
| 3,397,205 | 8/1968 | Luethi et al. | 260—249.9X |

JOHN M. FORD, Primary Examiner

U.S. Cl. X.R.

260—247.5R, 249.5; 252—106, 8.8; 424—249